(12) United States Patent  (10) Patent No.: US 8,944,604 B2
DeCusatis  (45) Date of Patent: Feb. 3, 2015

(54) THREE DIMENSIONAL IMAGE PROJECTOR WITH DUAL LIGHT MODULATORS

(71) Applicant: International Business Machines Corporation, Armonk, NY (US)

(72) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/672,980

(22) Filed: Nov. 9, 2012

(65) Prior Publication Data

US 2013/0188153 A1 Jul. 25, 2013

Related U.S. Application Data

(63) Continuation of application No. 13/357,737, filed on Jan. 25, 2012.

(51) Int. Cl.
G03B 21/00 (2006.01)
H04N 13/04 (2006.01)
G02B 27/26 (2006.01)
G03B 35/26 (2006.01)
F21V 9/14 (2006.01)
G03B 21/14 (2006.01)
G02B 27/10 (2006.01)
G03B 33/12 (2006.01)

(52) U.S. Cl.
CPC . *G03B 35/26* (2013.01); *F21V 9/14* (2013.01); *G02B 27/26* (2013.01); *G03B 21/14* (2013.01); *G02B 27/1033* (2013.01); *G03B 33/12* (2013.01)

USPC .............. 353/8; 348/51; 348/58; 359/465

(58) Field of Classification Search
USPC ....... 353/7, 8; 348/42–60; 359/462–477; 3/7, 3/8
See application file for complete search history.

(56) References Cited

U.S. PATENT DOCUMENTS 4,630,097 A  12/1986  Marks
4,870,486 A   9/1989  Nakagawa et al.
5,113,285 A   5/1992  Franklin et al.
(Continued)

FOREIGN PATENT DOCUMENTS

CN   1624525 A   6/2005
CN   1666269 A   9/2005
(Continued)

OTHER PUBLICATIONS

U.S. Appl. No. 13/357,704; Non Final Office Action; Date Filed: Jan. 25, 2012; Date Mailed: Jul. 15, 2013; pp. 1-24.
(Continued)

*Primary Examiner* — Thanh Luu
*Assistant Examiner* — Renee D Chavez
(74) *Attorney, Agent, or Firm* — Cantor Colburn LLP; Steven Chiu

(57) ABSTRACT

A method is provided for projecting a three-dimensional image. The system includes a first light source, the first light source emitting light in a first direction and a second light source emitting light in a second direction. A beam splitter device is disposed adjacent each light source and an imaging device is disposed adjacent the beam splitter device. Light from the first light source and the second light source travel a common optical path to a projector lens assembly.

19 Claims, 3 Drawing Sheets

(56) References Cited

U.S. PATENT DOCUMENTS

| | | | |
|---|---|---|---|
| 5,142,366 A | 8/1992 | Brown et al. | |
| 5,168,199 A | 12/1992 | Huffman et al. | |
| 5,420,484 A | 5/1995 | Morrish | |
| 5,751,479 A | 5/1998 | Hamagishi et al. | |
| 6,040,946 A | 3/2000 | Hebert | |
| 6,327,093 B1 | 12/2001 | Nakanishi et al. | |
| 6,344,927 B1 | 2/2002 | Itoh et al. | |
| 6,359,664 B1 | 3/2002 | Faris | |
| 6,672,722 B2 | 1/2004 | O'Connor et al. | |
| 6,704,065 B1 | 3/2004 | Sharp et al. | |
| 6,813,085 B2 | 11/2004 | Richards | |
| 7,081,997 B2 | 7/2006 | Sedlmayr | |
| 7,119,957 B2 | 10/2006 | Itoh et al. | |
| 7,270,428 B2 | 9/2007 | Alasaarela et al. | |
| 7,283,308 B2 | 10/2007 | Cossairt et al. | |
| 7,401,923 B2 | 7/2008 | Fergason | |
| 7,446,733 B1 | 11/2008 | Hirimai | |
| 7,468,844 B2 | 12/2008 | Hall, Jr. | |
| 7,477,220 B2 | 1/2009 | Muto | |
| 7,561,322 B1 | 7/2009 | Maeda et al. | |
| 7,649,915 B2 | 1/2010 | Fermann et al. | |
| 7,692,605 B2 | 4/2010 | Tsao | |
| 7,766,490 B2 | 8/2010 | Harbers et al. | |
| 7,773,160 B2 | 8/2010 | Yamazaki et al. | |
| 7,848,370 B2 | 12/2010 | Kewitsch et al. | |
| 8,337,020 B2 | 12/2012 | Handschy et al. | |
| 8,388,138 B1 * | 3/2013 | Boothroyd | 353/7 |
| 2002/0191235 A1 | 12/2002 | O'Connor et al. | |
| 2003/0179791 A1 | 9/2003 | Hiroshi et al. | |
| 2004/0109329 A1 | 6/2004 | Kato | |
| 2004/0155207 A1 | 8/2004 | Kleinschmidt | |
| 2004/0201879 A1 | 10/2004 | Shih et al. | |
| 2004/0207879 A1 | 10/2004 | Bailey et al. | |
| 2006/0187393 A1 | 8/2006 | Kuan et al. | |
| 2006/0232845 A1 | 10/2006 | Harned et al. | |
| 2006/0238716 A1 | 10/2006 | Lee et al. | |
| 2006/0279662 A1 | 12/2006 | Kapellner et al. | |
| 2006/0290889 A1 | 12/2006 | Robinson et al. | |
| 2007/0035830 A1 | 2/2007 | Matveev et al. | |
| 2007/0115230 A1 | 5/2007 | Tajiri et al. | |
| 2007/0139519 A1 | 6/2007 | DeCusatis et al. | |
| 2007/0139618 A1 | 6/2007 | DeCusatis et al. | |
| 2007/0139769 A1 | 6/2007 | DeCusatis et al. | |
| 2007/0146880 A1 | 6/2007 | Bleha et al. | |
| 2007/0181834 A1 | 8/2007 | Kleinschmidt | |
| 2007/0188863 A1 | 8/2007 | Sun et al. | |
| 2007/0195408 A1 | 8/2007 | Divelbiss et al. | |
| 2008/0018999 A1 | 1/2008 | Schuck et al. | |
| 2008/0043295 A1 | 2/2008 | Sakakibara | |
| 2008/0055550 A1 | 3/2008 | Kim | |
| 2008/0094577 A1 | 4/2008 | Krijn et al. | |
| 2008/0151193 A1 | 6/2008 | Reder | |
| 2009/0040463 A1 | 2/2009 | Chen et al. | |
| 2009/0086016 A1 | 4/2009 | Su | |
| 2009/0141242 A1 | 6/2009 | Silverstein et al. | |
| 2009/0180181 A1 | 7/2009 | Oakley | |
| 2009/0207379 A1 | 8/2009 | Oakley | |
| 2009/0231549 A1 | 9/2009 | Chen et al. | |
| 2009/0310042 A1 | 12/2009 | Vidal et al. | |
| 2010/0039624 A1 | 2/2010 | Fujinawa et al. | |
| 2010/0045938 A1 | 2/2010 | Lin et al. | |
| 2010/0110386 A1 | 5/2010 | Handschy et al. | |
| 2010/0118276 A1 | 5/2010 | Li | |
| 2010/0141856 A1 | 6/2010 | Schuck et al. | |
| 2010/0171909 A1 | 7/2010 | Handschy | |
| 2010/0189344 A1 | 7/2010 | Maes | |
| 2010/0208210 A1 | 8/2010 | Aastuen et al. | |
| 2010/0238413 A1 | 9/2010 | Huang | |
| 2010/0253769 A1 | 10/2010 | Coppeta et al. | |
| 2010/0272138 A1 | 10/2010 | Chiba et al. | |
| 2011/0089315 A1 | 4/2011 | Walt et al. | |
| 2011/0116051 A1 | 5/2011 | Young et al. | |
| 2011/0149253 A1 | 6/2011 | Mihashi et al. | |
| 2011/0204793 A1 | 8/2011 | Gardner, Jr. | |
| 2011/0211168 A1 | 9/2011 | Kim et al. | |
| 2011/0273539 A1 | 11/2011 | Yoon et al. | |
| 2012/0019529 A1 | 1/2012 | Kimpe et al. | |
| 2012/0287144 A1 | 11/2012 | Gandhi et al. | |
| 2012/0307211 A1 | 12/2012 | Hofmann et al. | |
| 2013/0077283 A1 | 3/2013 | Li | |
| 2013/0082994 A1 | 4/2013 | Al-Dahle | |
| 2013/0147393 A1 | 6/2013 | Bazzani et al. | |

FOREIGN PATENT DOCUMENTS

| | | |
|---|---|---|
| CN | 1721961 A | 1/2006 |
| CN | 1854810 A | 11/2006 |
| CN | 1885096 A | 12/2006 |
| CN | 1987552 A | 6/2007 |
| CN | 101196615 A | 6/2008 |
| CN | 101364037 A | 2/2009 |
| CN | 101373054 A | 2/2009 |
| CN | 101482665 A | 7/2009 |
| CN | 101571631 A | 11/2009 |
| CN | 101625467 A | 1/2010 |
| CN | 101770150 A | 7/2010 |
| CN | 201576164 U | 9/2010 |
| CN | 102043254 A | 5/2011 |
| CN | 102089701 A | 6/2011 |
| CN | 102193239 A | 9/2011 |
| CN | 202057900 U | 11/2011 |
| CN | 102289141 A | 12/2011 |
| CN | 102300108 A | 12/2011 |
| JP | 2000284223 A | 10/2000 |
| JP | 2001222064 A | 8/2001 |
| JP | 2007065408 A | 3/2007 |
| JP | 2008064809 A | 3/2008 |
| WO | 9952269 | 10/1999 |
| WO | 2005032150 A1 | 4/2005 |
| WO | 2008042615 A1 | 4/2008 |
| WO | 2010143891 A2 | 12/2010 |

OTHER PUBLICATIONS

U.S. Appl. No. 13/357,719; Non Final Office Action; Date Filed: Jan. 25, 2012; Date Mailed: Jul. 26, 2013; pp. 1-33.

U.S. Appl. No. 13/357,725; Non Final Office Action; Date Filed: Jan. 25, 2012; Date Mailed: Jul. 15, 2013; pp. 1-28.

International Application No. PCT/CN2013/070865; International Search Report and Written Opinion dated May 2, 2013, 14 pages.

International Application No. PCT/CN2013/070883; International Search Report and Written Opinion dated May 2, 2013, 12 pages.

International Application No. PCT/CN2013/070831; International Search Report and Written Opinion dated May 9, 2013, 11 pages.

International Application No. PCT/CN2013/070888; International Search Report and Written Opinion dated May 2, 2013, 11 pages.

International Application No. PCT/CN2013/070828; International Search Report and Written Opinion dated Apr. 25, 2013, 13 pages.

U.S. Appl. No. 13/672,877; Non Final Office Action; Date Filed: Nov. 9, 2012; Date Mailed: Oct. 3, 2013; pp. 1-24.

Chen et al.; "Simple Multimode Stereoscopic Liquid Crystal Display"; Japanese Journal of Applied Physics; Part 2 (Letters); vol. 36; No. 12B; pp. L1685-L1688; Dec. 15, 1997.

Fergason et al.; An innovative beamsplitter-based stereoscopic/3D display design, Proceedings of SPIE—The International Society for Optical Engineering; vol. 5664; No. 1; pp. 488-494; Mar. 22, 2005.

Pezzaniti et al.; "Flat Panel 3D Display for Unmanned Ground Vehicles"; Proceedings of SPIE—The International Society for Optical Engineering; vol. 7332; pp. 73320N, 2009.

U.S. Appl. No. 13/357,704; Final Office Action; Date Filed: Jan. 25, 2012; Date Mailed: Oct. 30, 2013; pp. 1-23.

U.S. Appl. No. 13/357,719; Final Office Action; Date Filed: Jan. 25, 2012; Date Mailed: Jan. 27, 2014; pp. 1-37.

U.S. Appl. No. 13/673,462; Non-Final Office Action; Date Filed: Nov. 9, 2012; Date Mailed: Jan. 30, 2014; pp. 1-53.

U.S. Appl. No. 13/672,947; Non Final Office Action; Date Filed: Nov. 9, 2012; Date Mailed: Nov. 26, 2013; pp. 1-40.

U.S. Appl. No. 13/673,112; Non Final Office Action; Date Filed: Nov. 9, 2012; Date Mailed: Dec. 13, 2013; pp. 1-42.

(56) References Cited

OTHER PUBLICATIONS

U.S. Appl. No. 13/651,780; Notice of Allowance; Date Filed: Oct. 15, 2012; Date Mailed: Dec. 23, 2013 pp. 1-21.
U.S. Appl. No. 13/357,707; Non Final Office Action; Date Filed: Jan. 25, 2012; Date Mailed: Feb. 4, 2014; pp. 1-56.
U.S. Appl. No. 13/651,715; Non Final Office Action; Date Filed: Oct. 15, 2012; Date Mailed: Feb. 5, 2014; pp. 1-52.
U.S. Appl. No. 13/357,737; Notice of Allowance; Date Filed: Jan. 25, 2012; Date Mailed: Jan. 13, 2014; pp. 1-17.
U.S. Appl. No. 13/357,725; Notice of Allowance; Date Filed: Jan. 25, 2012; Date Mailed: Jan. 17, 2014; pp. 1-16.
U.S. Appl. No. 13/357,725; Notice of Allowance; Date Filed: Jan. 25, 2012; Date Mailed: Nov. 20, 2013; pp. 1-33.
U.S. Appl. No. 13/357,737; Notice of Allowance; Date Filed: Jan. 25, 2012; Date Mailed: Nov. 22, 2013; pp. 1-56.
U.S. Appl. No. 13,672,877; Final Office Action; Date Filed: Nov. 9, 2012; Date Mailed: Mar. 26, 2014; pp. 1-18.
International Search Report for International Application No. PCT/CN2013/076777; Date Mailed: Mar. 13, 2014, 11 pages.
U.S. Appl. No. 13/357,715; Non Final Office Action; Date Filed: Jan. 25, 2012; Date Mailed: Feb. 26, 2014; pp. 1-40.
U.S. Appl. No. 13/357,767; Non Final Office Action; Date Filed: Jan. 25, 2012; Date Mailed: Mar. 10, 2014; pp. 1-37.
U.S. Appl. No. 14/062,920; Non Final Office Action; Date Filed: Oct. 25, 2013; Date Mailed: Mar. 10, 2014; pp. 1-33.
U.S. Appl. No. 13/357,704; Non-Final Office Action; Date Filed: Jan. 25, 2012; Date Mailed: Mar. 18, 2014; pp. 1-36.
U.S. Appl. No. 13/357,725; Non-Final Office Action; Date Filed: Jan. 25, 2012; Mailing Date: Mar. 21, 2014; pp. 1-14.
U.S. Appl. No. 13/651,780; Notice of Allowance; Date Filed: Oct. 15, 2012; Date Mailed: Feb. 28, 2014, pp. 1-14.
U.S. Appl. No. 13/673,112; Notice of Allowance; Date Filed: Nov. 9, 2012; Date Mailed: Apr. 30, 2014; pp. 1-24.
U.S. Appl. No. 13/672,947; Notice of Allownce; Date Filed: Nov. 9, 2012; Date Mailed: Apr. 30, 2014; pp. 1-23.
U.S. Appl. No. 13/357,707; Final Office Action; Date Filed: Jan. 25, 2012; Date Mailed: Jun. 12, 2014; pp. 1-22.
U.S. Appl. No. 13/357,719; Final Office Action; Date Filed: Jan. 25, 2012; Date Mailed: Jun. 19, 2014; pp. 1-44.
U.S. Appl. No. 13/672,877; Notice of Allowance; Date Filed: Nov. 9, 2012; Date Mailed: Jun. 25, 2014, pp. 1-11.
U.S. Appl. No. 13/673,462; Final Office Action; Date Filed: Nov. 9, 2012; Date Mailed: Jun. 12, 2014; 19 pages.
U.S. Appl. No. 14/051,477; Non-Final Office Action; Date Filed: Oct. 11, 2013; Date Mailed Jun. 20, 2014; 31 pages.

* cited by examiner

THREE DIMENSIONAL IMAGE PROJECTOR WITH DUAL LIGHT MODULATORS

CROSS-REFERENCE TO RELATED APPLICATION

This application is a continuation of U.S. patent application Ser. No. 13/357,737, filed Jan. 25, 2012, the content of which is hereby incorporated by reference in its entirety.

BACKGROUND

The present invention relates to a stereoscopic three dimensional image projector, and more specifically, to a small three dimensional projector usable with passive glasses.

Three dimensional (3D) movies and pictures have become a popular form of entertainment due to the increased realism of the images. 3D images utilize the human physical trait of binocular vision. Human eyes are spaced about 2 inches (5 centimeters) apart; therefore each eye sees the world from a slightly different perspective. The brain receives both images and has a binocular vision function that correlate the difference between what each eye sees to determine distance. The determination of the distance provides the three-dimensional effect that a person sees.

To create a binocular image on a two dimensional surface, such as a movie or television screen, the user typically wears glasses. The glasses alter the way that the user views the images to create the simulated 3D effect. Typically there are two types of glasses, passive glasses and active glasses. The type of glasses used will depend on the type of image projection system being used.

Passive glasses rely upon an optical effect created by using different lenses for each eye. The projection system emits a sequential series of images where subsequent images are slightly offset. The images are arranged such that the user sees the first image through a first lens of the glasses (e.g. the right eye) and the second image is seen with the other lens (e.g. the left eye). Since the images are projected quickly, the user does not notice the multiple images, but rather sees a three dimensional effect. Originally, passive glasses used different color lenses to filter out images; however this limited the use of 3D images when full color images are desired. To alleviate this issue, polarized lenses were developed where each lens of the glasses allowed the transmission of different polarized light. The polarized passive lenses allowed for full color 3D images to be transmitted. Passive lenses are more common with projector type systems, such as movie theaters for example, where multiple projectors may be used to project the images on a screen.

The development of 3D television systems created a new challenge as there typically isn't enough room for multiple projectors. To accommodate this, active lenses were created. With an active lens, the glasses wirelessly communicate with the projector to synchronize the glasses operation with the images being displayed. With active glasses, the lenses are typically liquid crystal displays that can switch between transmitting light and blocking light. In this way, the glasses may rapidly switch the left and right lenses between clear and opaque. While the glasses are switching, the television is projecting a series of sequential images. When this switching is synchronized between the television and the glasses, the user experiences a three dimensional effect.

Accordingly, while existing three dimensional projectors are suitable for their intended purpose a need for improvement remains, particularly in providing a system with a single projector that can project images viewable with passive glasses.

BRIEF SUMMARY

According to one embodiment of the invention, a method is provided having a first light source and a second light source. A first polarizing beam splitter (PBS) is disposed adjacent the first light source and a second PBS is located adjacent the second light source. A first imaging device is adjacent the first PBS and a second imaging device is adjacent the second PBS. Additionally, disposed between the first PBS and the second PBS is a third PBS. The first light source emits a first light. The first light is reflected from the first PBS onto the first imaging device. The image reflects from the first imaging device to the third PBS.

According to another embodiment of the present invention, a method of projecting a three dimensional image is provided having a first light source with a first polarization and a second light source with a second orientation wherein the first polarization is orthogonal to the second polarization. A first eye image of a first color is projected from the first light source. A second eye image of the same first color is projected from the second light source. A first eye image of a second color is projected from the first light source. A second eye image of the same second color is projected from the second light source. A first eye image of a third color is projected from the first light source. A second eye image of a third color is projected from the second light source.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Contemporary three-dimensional (3D) image projectors that use passive glasses have typically use two projectors. Previous efforts to use only a single projector rely upon an active lens within the projector that switches between the sequential images. It should be appreciated that substantial costs may be involved in using redundant projectors or having a costly active lens. Further, these techniques do not scale well as users desire comparable performance from smaller and smaller projector packages.

A second type of projector uses active glasses having a liquid crystal diode (LCD) lens that coordinates with the projector (typically a television). The active glasses alternately block one of the lenses such that the user will see sequential images through alternating lenses. While active glasses perform well to create the 3D effect for the user, they also have some less desirable characteristics. The active glasses require an energy source such as a battery that needs to be periodically recharged or replaced. If the communication between the television and the glasses is interrupted, the 3D effect may be lost. Further, due to the complexity of the system, the active glasses tend to be much more costly.

Figure 1:
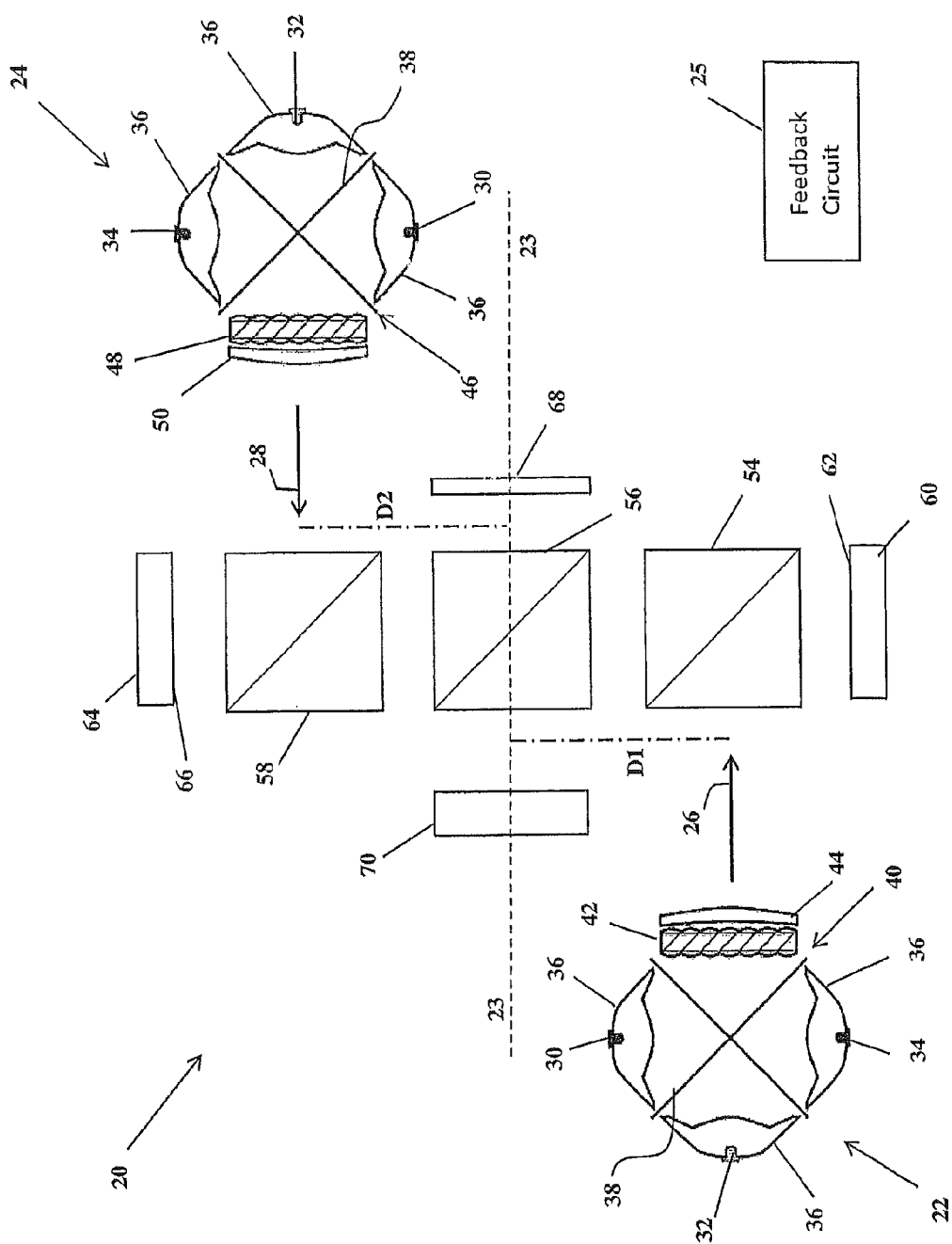
FIG. 1 is a schematic view of a three-dimensional image projector in accordance with an embodiment of the invention.

With reference now to FIG. 1, a three-dimensional projector 20 is shown for projecting a three-dimensional (3D) image in accordance with an embodiment of the invention. The projector 20 includes a first light source 22 and a second light source 24 arranged to emit light in opposite directions. The direction of light from first light source 22, indicated by arrow 26, is substantially 180 degrees apart from the direction of the light from second light source 24, as indicated by arrow 28. The first and second light sources 22, 24 may be disposed on opposite sides of centerline 23. In one embodiment, the first and second light sources 22, 24 are offset from each other. The first light source 22 is spaced a distance D1 from a centerline 23 of the projector and the second light source 24 is spaced a distance D2 from the centerline 23. The first and second light sources 22, 24 may be spaced equidistantly from centerline 23 such that distance D1 is equal to distance D2. In the exemplary embodiment, each light source includes three monochromatic light emitting diodes (LED), a red LED 30, a green LED 32 and a blue LED 34. The LED's 30, 32, 34 are arranged to form three sides of a square and direct light toward the center of the first and second light sources 22, 24. Each LED 30, 32, 34 may be coupled to direct light into a light collection optic 36.

The light collection optic 36 directs the light from the LED's 30, 32, 34 into a dichroic color combiner 38. The dichroic color combiner 38 combines light from the LED's to create a desired light color. The light from the first light source 22 exits via an open side 40 and passes through a first fly's eye lens 42 and a first pre-polarizer lens 44. The first fly's eye lens 42 consists of an array of lenslets that have the effect of breaking the transmitted light into many components and projecting them evenly over the field of view. The result is even, bright illumination without any reduction in light intensity at the periphery of the projected light. The first pre-polarizer lens 44 changes the polarization of the outgoing light to have a desired polarization characteristic that is suitable for the imaging device being used. Once the light leaves first the pre-polarization lens 44, the light passes into a first polarizing beam splitter device 54 (PBS).

Similar to the first light source 22, the light from the second light source 24 leaves an open side 46 and enters a second fly's eye lens 48 and a second pre-polarization lens 50. After being conditioned by these lenses 48, 50, the second light enters a second PBS 58.

A PBS 54, 56, 58 is an optical component that splits incident light rays into a first (transmitted) polarization component and a second (reflected) polarization component. A first PBS 54 is positioned adjacent to the pre-polarizer lens 44 and a second PBS 58 is located adjacent to pre-polarizer lens 50. First and second imaging devices 60, 64 are positioned adjacent each of the first and second PBS 54, 58 respectively. In one embodiment, the first PBS 54 and the first imaging device 60 are arranged on an opposite side of centerline 23 from the second PBS 58 and second imaging device 64. The first imaging device 60 and the second imaging device 64 may be arranged such that the imaging surfaces 62, 66 are on opposing sides of centerline 23. In still another embodiment, the imaging surfaces are disposed to reflect light in a direction substantially perpendicular to the arrows 26 and 28. In the exemplary embodiment, the imaging devices 60, 64 may be liquid crystal on silicone (LCoS) type devices that have an imaging surface 62, 66 adjacent each respective PBS 54, 58. In operation, the light from either lighting source 22, 24 reflects off the surface 62, 66 of the respective imaging device 60, 64 and back through the respective PBS 54, 58 to a middle or third PBS 56. For example, if the light was emitted by the first light source 22, the first light, reflecting off of the surface 62 of the first imaging device 60, will pass through the first PBS 54 to the third PBS 56 which in turn reflects the first light into a projection lens assembly 70 and out of the device 20. Similarly, if the light was emitted by the second light source 24, the second light will reflect off of the surface 66 of second imaging device 64, and pass through second PBS 58 to third PBS 56. Because the polarization of the second light is orthogonal to the polarization of the first light, the third PBS 56 reflects the light outwards in a direction opposite the projection lens assembly 70 and towards a mirror 68. The second light reflects off of minor 68 and reenters third PBS 56. Because the second light enters the third PBS 56 from a different angle, the light passes through PBS 56 and continues outward towards the projection lens assembly 70 along the same optical path as the first light. Thus the light from both the first and second light sources 22, 24 exits the projector 20 and is transmitted along a common optical path. In the present embodiment, use of an LCoS imaging device 60, 64 provides advantages in that the LCoS device inherently polarizes the reflected light.

Figure 2:
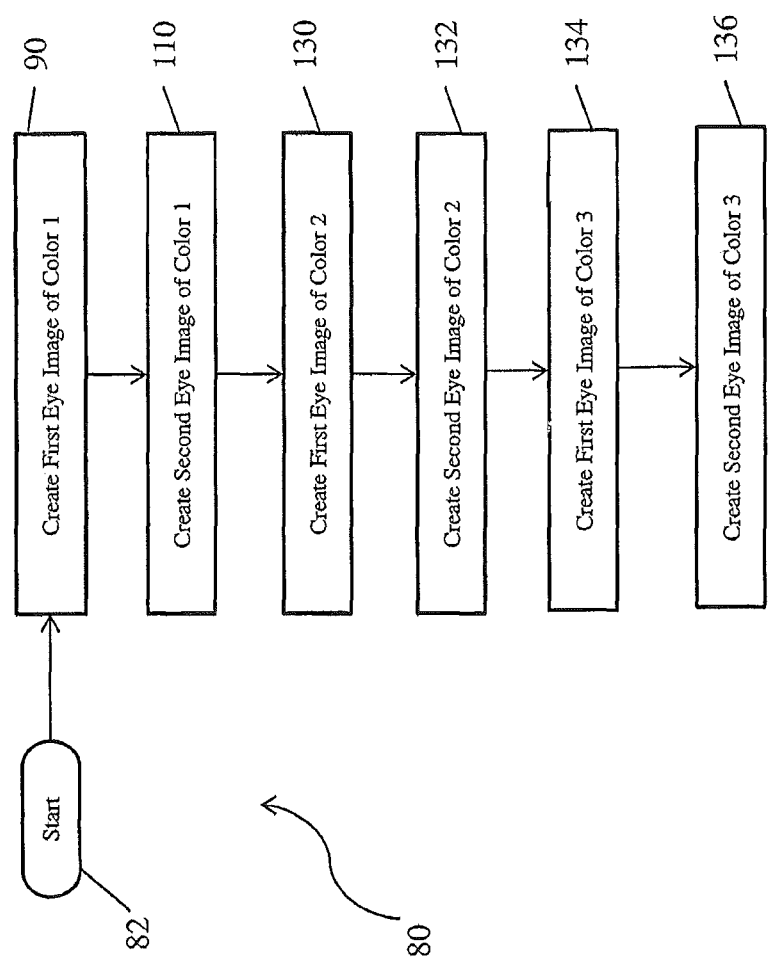
FIG. 2 is a flow chart for a method of operating a three-dimensional image projector in accordance with an embodiment of the invention; and, FIG. 3 is another flow chart for a method of operating the three-dimensional image projector in accordance with an embodiment of the invention.

To create a 3D image, the image content for the left and right eye needs to be independently modulated with orthogonal polarizations of light. The light emitted from each light source has a polarization orthogonal to the light emitted from the other light source; consequently, the first light source provides all of the image content for a first eye, and the second light source provides all of the image content for the other or second eye. Referring to the flow chart in FIG. 2, the projector device 20 works by activating the first and second light sources sequentially such that both the left and right eye images of a first color are projected before either the left or right eye image of a second color. In block 90, a light source, such as light source 22, emits a light such that an image for a first eye, such as the left eye, is projected from projector 20. This image will be a first color from the plurality of LEDs within the light source, such as red. In block 110, another light source, such as light source 24, will similarly emit a light of the same color, such that an image for a second eye, for example the right eye, is projected out of projector 20. Once both light sources have projected an image of a first color, the first light source 22 will then project an image of a second color, such as blue, as in block 130. In block 132, the second light source will then project an image of the same second color. This pattern repeats in blocks 134 and 136 such that the first and second light sources 22, 24 sequentially produce images of a third color from the plurality of LEDs within both light sources, such as green. Although the colors need not be projected in any particular order, conventional systems commonly emit a red light first, a green light second, and lastly a blue light.

In some embodiments, it should be appreciated that the combination of light sources 22 and 24, polarized beam splitters (PBS) 54, 56, and 58, and LCoS devices 60, 64 provide advantages in reducing the size of the projector into the category of a pico-projector or micro-projector. These small projectors may be suitable to be used in a portable electronic device, such as but not limited to a cellular phone, a tablet computer, a laptop computer, and a hand-held gaming device for example. Embodiments of the present invention may also be used in non-portable devices, such as but not limited to a desktop computer or a television for example.

The projector 20 may also include an optional feedback circuit 25. The feedback circuit 25 is electrically coupled to communicate with the first light source 22, the second light source 24, the first and second PBS 54, 58 and the first and second imaging devices 60, 64. The feedback circuit 25 provides a modulation signal to the light sources 22, 24, to keep the light sources and LCoS imaging devices synchronized during operation. The feedback circuit 25 may additionally include LED drivers for both the first and second light sources 22, 24 to control the order of the LED colors being used in the images emitted by each source. The feedback circuit 25 provides functionality to enable each light source 22, 24 to emit the correct color light that corresponds to an image being displayed on the surface 62, 66 of the respective imaging devices.

Figure 3:
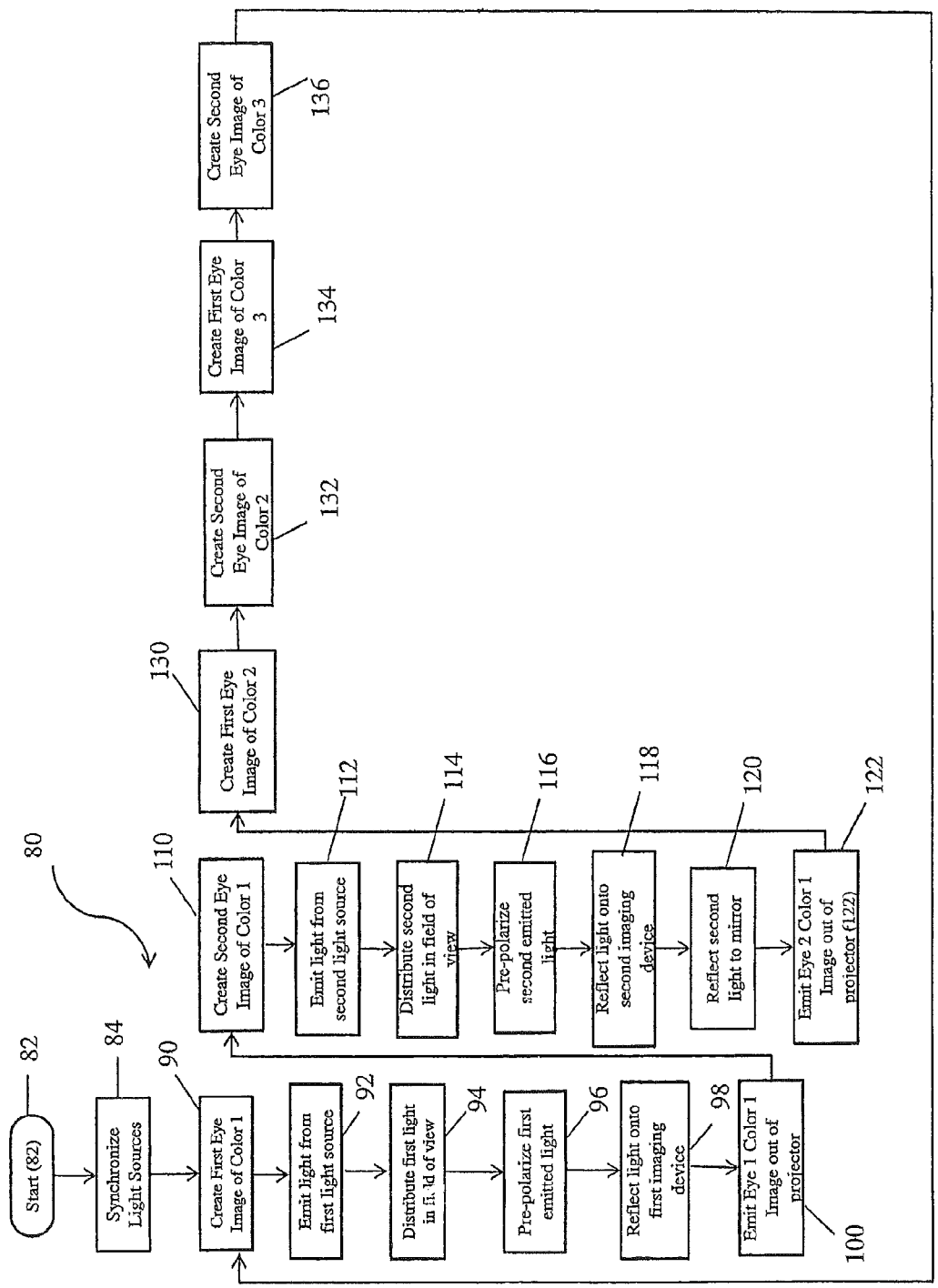

Referring now to FIG. 3, another method 80 is shown for operating a three dimensional image projector. The method 80 first synchronizes the light sources in block 84 and creates a first eye image in block 90. To create the first image, a light source, such as first light source 22, emits a first light of a first color LED, for example red, from the plurality of LEDS within the first light source in block 92. In block 94, the light is combined by the dichroic color combiner 38 and passes through a first fly's eye lens 42 which projects the transmitted light evenly over the field of view. The light then passes through the pre-polarizer lens 44, as shown in block 96, where the light is given a certain polarization such that it reflects from the first PBS 54. The light from the first light source reflects off of the first PBS 54 and onto a first imaging device 60, such as an LCoS imaging device. In block 98, the first light reflects off of the first imaging device 60 and through the first PBS 54 to a middle or third PBS 56 disposed between the first and second PBS 54, 58. The light reflects out of third PBS 56 to a projection lens assembly 70 to project a first eye image of a first color, such as a red image for the left eye. After the first eye image of a first color is projected, a second eye image of the same first color is then projected, as shown in block 110. To project this second eye image, in block 112 a light source, such as second light source 24, emits a second light of the same color as the first light emitted by first light source 22. The second light similarly is combined by a dichroic color combiner 38 and passes through a second fly's eye lens 48 which projects the transmitted light evenly over the field of view collected by a dichroic minor. In block 116, the second light is polarized by second pre-polarizer lens 50 such that it reflects from the second PBS 58 and onto the second imaging device 64. The light then reflects off of the surface 66 of the second imaging device 64 in block 118, and through the second PBS 58 to a third PBS 56.

Because of the polarization of the second light, which is orthogonal to the light emitted by the first light source, the second light is reflected from third PBS 56 in a direction opposite the projection lens assembly 70 to a minor 68 as shown in block 120. The second light reflects off the mirror 68, back through the third PBS 56 and outwards towards the projection lens assembly 70 along the same optical path as the first light. In one example, this second light may be the red image for the right eye. Once both the first and second light sources have emitted images using the same first color LED, the first light source will then emit another image for the first eye using a second color LED from the plurality of LEDS within the first light source, as shown in block 130. Once the second color image from first light source has been projected, the second light source will similarly produce an image using the same color LED as the prior first light source emission, but a different color LED than the previous second light source image. For example, if the first set of left and right eye images were red, the next set of left and right eye images from the first and second light sources could be either green or blue in color. This cycle continues in blocks 134 and 136 such that both of the images produced by first light source and second light source are the remaining color from the plurality of LEDs within the light source. Projection of all three sets of left and right eye images produces a three-dimensional color image visible to a viewer wearing passive lenses. The method then loops back to block 90 to continue projecting images from the projector device 20 in the color sequence.

Embodiments of the present invention provide for a small, reliable three-dimensional projector. Embodiments of the present invention provide advantages of having multiple light sources that are arranged to have the same path length for projecting the image. Embodiments provide advantages in emitting a three-dimensional image usable with passive glasses.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:
1. A method comprising:
providing a first light source and a second light source;

providing a first polarizing beam device (PBS) adjacent the first light source and a second PBS adjacent the second light source;
providing a first fly's eye lens between the first light source and the first PBS;
providing a first pre-polarizer lens between the first fly's eye lens and the first PBS:
providing a second fly's eye lens between the second light source and the second PBS:
providing a second pre-polarizer lens between the second fly's eye lens and the second PBS;
providing a first imaging device adjacent the first PBS and a second imaging device adjacent the second PBS;
providing a third PBS disposed between the first PBS and the second PBS;
providing a minor adjacent the third PBS;
emitting a first light from the first light source;
reflecting the first light with the first PBS onto the first imaging device; and,
reflecting the first light off of the first imaging device to the third PBS.

2. The method of claim 1 wherein the first imaging device and the second imaging device are LCoS devices.

3. The method of claim 1 further comprising:
emitting a second light from the second light source after the first light is emitted;
reflecting the second light with the second PBS onto the second imaging device;
reflecting the second light off the second imaging device to the third PBS;
reflecting the second light to the mirror; and,
reflecting the second light off of the mirror and back to the third PBS.

4. The method of claim 3 wherein the first light emitted by the first light source has a first polarization and the second light emitted by the second light source has a second polarization, and the first polarization and the second polarization are orthogonal to one another.

5. The method of claim 3 wherein the first light emitted by the first light source is in a first direction and the second light emitted by the second light source is in a second direction, and the first direction and the second direction are opposite each other.

6. The method of claim 3 further comprising:
providing a projection lens assembly on the opposite side of the third PBS from the mirror;
reflecting the first light from the third PBS to the projection lens assembly; and,
emitting the second light reflected from the mirror through the third PBS to the projection lens assembly.

7. The method of claim 6 wherein the first light and the second light are transmitted along the same optical path between the third PBS and the projection lens assembly.

8. The method of claim 3 wherein:
the first light source includes a plurality of first LEDs, the plurality of first LEDs comprising a first red light emitting diode (LED), a first green LED and a first blue LED;
the first light is comprised of light emitted from the first red LED, the first green LED and the first blue LED;
the second light source includes a plurality of second LEDs, the plurality of second LEDs comprising a second red LED, a second green LED, and a second blue LED; and,
the second light is comprised of light emitted from the second red LED, the second green LED and the second blue LED.

9. The method of claim 8 wherein the first light emitted by the first light source comprises a light emitted from a first LED of the plurality of first LEDs, and the second light emitted by the second light source comprises a light emitted from the first LED of the plurality of second LEDs and the first light and the second light are the same first color.

10. The method of claim 9 wherein after the first light and the second light are initially emitted having the same first color, the first light emitted by the first light source then comprises light emitted from a second LED of the plurality of first LEDs, and the second light emitted by the second light source then comprises a light emitted from a second LED of the plurality of second LEDs, and the first light and the second light are the same second color.

11. A system comprising:
a first light source emitting light having a first polarization;
a second light source emitting light having a second polarization;
wherein the first polarization is orthogonal to the second polarization;
a first beam splitter device (PBS) adjacent the first light source;
a second PBS adjacent the second light source;
a first imaging device adjacent the first PBS;
a second imaging device adjacent the second PBS;
a third PBS disposed between the first PBS and the second PBS;
a projection lens assembly located adjacent the third PBS; and,
a mirror disposed on the side of the third PBS opposite the projection lens assembly.

12. The system of claim 11 wherein the first light source emits a first light in a first direction and the second light source emits a second light in a second direction, the second direction being opposite the first direction.

13. The system of claim 11 wherein the first imaging device and the second imaging device are LCoS devices.

14. The system of claim 11 wherein the light emitted by the first light source and the light emitted by the second light source are transmitted along the same optical path from the third PBS to the projection lens assembly.

15. The system of claim 11 further comprising:
a first fly's eye lens arranged between the first light source and the first PBS; and,
a first pre-polarizer lens arranged between the first fly's eye lens and the first PBS.

16. The system of claim 15 further comprising:
a second fly's eye lens arranged between the second light source and the second PBS; and,
a second pre-polarizer lens arranged between the second fly's eye lens and the second PBS.

17. The system of claim 16 wherein the second light source comprises:
a plurality of second LED devices;
a plurality of second light collection optics, each of the plurality of second light collection optics associated with one of the plurality of second LED devices; and,
a second dichroic color combiner disposed between the plurality of second light collection optics, the second dichroic color combiner arranged to direct light from the plurality of second LED devices into the second fly's eye lens.

18. The system of claim 15 wherein the first light source comprises:
a plurality of first LED devices;

a plurality of first light collection optics, each of the plurality of first light collection optics associated with one of the plurality of first LED devices; and, a first dichroic color combiner disposed between the plurality of first light collection optics, the first dichroic color combiner arranged to direct light from the plurality of first LED devices into the first fly's eye lens.

19. The system of claim 11 further comprising a feedback circuit coupled to the first light source, the second light source, the first PBS, the second PBS, the first imaging device, and the second imaging device.

* * * * *